United States Patent [19]
Thomson

[11] Patent Number: 6,073,205
[45] Date of Patent: Jun. 6, 2000

[54] SYSTEM AND METHOD OF WRITE POSTING IN A UNIVERSAL SERIAL BUS SYSTEM

[75] Inventor: Andrew Thomson, Austin, Tex.

[73] Assignee: National Instruments Corporation, Austin, Tex.

[21] Appl. No.: 08/891,150

[22] Filed: Jul. 10, 1997

[51] Int. Cl.[7] .................................................. G06F 13/14
[52] U.S. Cl. ..................... 711/100; 711/168; 711/169; 711/147; 710/53; 710/33; 710/113
[58] Field of Search .......................... 395/101, 840–841, 395/872–877, 118; 711/149, 168, 169, 146, 100, 148; 710/3, 52, 113, 33

[56] References Cited

U.S. PATENT DOCUMENTS

| | | | |
|---|---|---|---|
| 4,258,418 | 3/1981 | Heath ........................................ | 710/53 |
| 4,805,094 | 2/1989 | Oye et al. .................................. | 710/53 |
| 4,860,292 | 8/1989 | Newman et al. ........................ | 714/748 |
| 5,163,132 | 11/1992 | DuLac et al. ............................ | 395/873 |
| 5,224,213 | 6/1993 | Dieffenderfer et al. ................ | 395/873 |
| 5,239,644 | 8/1993 | Seki et al. ................................. | 710/52 |
| 5,394,531 | 2/1995 | Smith ...................................... | 711/136 |
| 5,487,171 | 1/1996 | Dodt et al. ................................ | 710/20 |
| 5,539,915 | 7/1996 | Burton et al. ............................ | 395/841 |
| 5,590,310 | 12/1996 | Willenz et al. ........................... | 711/146 |
| 5,594,926 | 1/1997 | Chang et al. ............................. | 710/52 |
| 5,604,843 | 2/1997 | Shaw et al. .............................. | 395/101 |
| 5,619,723 | 4/1997 | Jones et al. ................................ | 710/3 |
| 5,630,166 | 5/1997 | Gamache et al. ......................... | 712/29 |
| 5,651,137 | 7/1997 | MacWilliams et al. ................ | 711/141 |
| 5,793,992 | 8/1998 | Steele et al. ............................. | 710/113 |
| 5,832,300 | 11/1998 | Lowthert .................................. | 710/33 |
| 5,845,152 | 12/1998 | Anderson et al. ........................ | 710/52 |

OTHER PUBLICATIONS

Universal Serial Bus Specification, revision 0.9, Mar. 31, 1995, pp. 1–25.

Universal Serial Bus Bulletin, vol. 2, No. 3, Aug. 1996, pp. 1–8.

*Primary Examiner*—Do Hyun Yoo
*Assistant Examiner*—Than Nguyen
*Attorney, Agent, or Firm*—Conley, Rose & Tayon, P.C.; Jeffrey C. Hood; Eric A. Stephenson

[57] ABSTRACT

An apparatus and method for write posting in a universal serial bus (USB) system includes a host computer connected to USB devices via a USB. The host computer generates requests to write data to memory within the USB device. The host computer includes a queue for posting the write requests on generation thereof. The write requests are posted in the queue until the host computer transmits a single data packet generated from the posted write requests. The Data packet is generated in response to the host computer generating a request to read data from the USB device, the host computer determining that the most recently posted write request is directed to a memory location within the USB device which is nonpostable, or an indication that the queue lacks storage space for subsequent write requests. The USB device receives the transmitted Data packet from the host computer and writes data to internal memory locations in accordance with the received Data packet.

16 Claims, 5 Drawing Sheets

SYSTEM AND METHOD OF WRITE POSTING IN A UNIVERSAL SERIAL BUS SYSTEM

BACKGROUND OF THE INVENTION

1. Field of the Invention

The present invention generally relates to the art of universal serial bus (USB) systems, and more particularly, to a method and apparatus for posting write data requests.

2. Description of the Relevant Art

The USB specification is a proposed standard recently promulgated by a group of companies including Compaq Computer Corporation, Digital Equipment Corporation, International Business Machines Corporation, Intel Corporation, Microsoft Corporation, and Northern Telecom Limited. Described below are various aspects of the USB relevant to a complete understanding of the present invention. Further background concerning the USB may be obtained from USB Specification, Revision 1.0 which is incorporated herein by reference.

The USB is a cable bus which supports data exchange between a host computer and a wide range of peripheral devices. The USB provides two wire, point-to-point signaling in which the signals are differentially driven at a bit rate of 12 megabits per second.

USB systems are generally defined in terms of (1) interconnects, (2) devices, and (3) hosts. The USB interconnect defines the manner in which the USB devices are connected to and communicate with the USB host. There is generally only one host on any USB system. A USB interface to the host computer system is referred to as the host controller. The host controller may be implemented in a combination of hardware, firmware, or software. USB devices are defined as (1) hubs, which provide additional attachment points to the USB, or (2) finctions, which provide capabilities to the system; e.g., an ISDN connection, a digital joystick, or speakers. Hubs indicate the attachment or removal of a USB device in its per port status bit. The host determines if a newly attached USB device is a hub or a function and assigns a unique USB address to the USB device. All USB devices are accessed by a unique USB address. Each device additionally supports one or more endpoints with which the host may communicate. The remaining description will be limited to USB devices defined as functions.

The USB supports functional data and control exchange between the USB host and USB devices. USB data transfers take place between host software and a particular endpoint on a USB device. The USB architecture comprehends three basic types of data transfer: (1) isochronous or streaming real time data which occupies a prenegotiated amount of USB bandwidth with a prenegotiated latency; (2) asynchronous interactive data such as characters or coordinates with human perceptible echo or feedback response characteristics, and; (3) asynchronous block transfer data which is generated or consumed in relatively large and bursty quantities and has wide dynamic latitude and transmission constraints.

The USB host interacts with USB devices through the host controller. The host controller is responsible for detecting the attachment and removal of USB devices, managing control flow between the host and USB devices, managing data flow between the host and USB devices, collecting status and activity statistics, and providing a limited amount of power to attached USB devices. The USB system software on the host manages interactions between the USB devices and device software. There are five areas of interactions between the USB system software and device software. They include: (1) device enumeration and configuration; (2) isochronous data transfers; (3) asynchronous data transfers; (4) power management, and; (5) device and bus management information.

Bus transactions including data transfers generally involve the transmission of three different packets, e.g. Token, Data, and Handshake. All packets begin with a SYNC field, which is used by input circuitry to align incoming data with a local clock. A packet identifier (PID) immediately follows the SYNC field of every USB packet. The PID consists of a four-bit ID field followed by a four-bit check field. The PID indicates the type of packet (e.g., Token, Data, and Handshake) and the format of the packet along with the type of variant detection applied to the packet. The four-bit check field of the PID insures reliable decoding.

Token packets include an ADDR field which specifies the target USB device, via its USB address, that is the source or destination of a Data packet, depending on the value of the Token PID. USB devices must perform a complete decoding of the ADDR field.

A Data packet includes a data field which may range from zero to N bytes and must be in integral numbers of bytes. Data bits within each byte are shifted out most significant bit first. The data field of a Data packet is divided into fields which give extra information to the USB device regarding the request being made. One field, the command code, tells what the targeted USB device should do, such as set up a read from a USB device space or set up a write to a USB device space. The read space command is used to request information from a given location in a given space of a USB device. The command is used to set up the read, which is followed by a request from the host for the USB device to send data. The USB device then sends the data it has retrieved from the previously specified space. The write space command uses exactly the same definition as the read space command. However, the Data packet contains data transferred by the host to the USB device.

Handshake packets consist of only a PID. Handshake packets are used to report the status of a data transfer, and can return values indicating successful reception of data, CRC failure, flow control, and certain fault conditions.

Each data transfer begins when the host controller, on a scheduled basis, sends a Token packet describing the type of transfer (e.g. write to or read from USB device), the USB address of the targeted USB device, and an endpoint number therein. The USB device addressed in the Token Packet selects itself by decoding the appropriate address field ADDR. In any given data transfer, data is transferred either from the host to a device (e.g. write data transfer) or from a device to the host (e.g. read data transfer) depending on the Token Packet's PID.

In the case where the host sends or writes data, the target USB device decodes the incoming Token's ADDR. If the USB device's address matches ADDR of the Token, the USB device accepts a subsequent host provided Data packet containing write data and internal USB addresses where the data is to be written. At the end of the transmission, the USB device performs a CRC check over the data portion of the packet and uses the result to determine if the data transfer was successful. The USB device replies with a Handshake which informs the host of the outcome.

In the case where the host seeks to read data from a USB device, the host must issue two sets of packets. The first set of packets is used to set up the read operation in the USB device. The second set of packets is used to actually send the requested data to the host. If the decoded address in the first Token matches that assigned to the targeted USB device, the targeted USB device is alerted that the host will send a Data packet containing the command codes necessary for setting up the read operation in the device. Subsequent thereto, the host issues the Data packet containing those command codes. The command codes include the address or addresses internal to the targeted USB device where the requested data is stored. The targeted USB device returns a Handshake acknowledging proper receipt of the first Data packet while requested data is being transferred to a packet buffer. The host then issues a second Token packet requesting the targeted USB device to send data. In response, the USB sends the Data packet containing the requested data. Finally, the host device transmits a Handshake packet to the targeted USB device acknowledging proper receipt of the requested data.

USB devices have two different kinds of logical buffers: packet buffer and elasticity buffer. The host never directly accesses these buffers. However, the characteristics of these buffers must be known to the host in order for the correct bounds for packet sizes to be established. The packet buffer determines the maximum packet size which the USB device can receive or send. This is conceptually a "latch" directly attached to a USB interface which initially receives packets from and sends packets to the USB. From here, the USB device will appropriately dispatch to other areas within the USB device, data received from the host, or dispatch to the host a packet containing data received from the other areas within the USB device, depending on commands received from the host and the USB device's internal division of labor.

Port consolidation for existing devices is a primary goal for USB. It follows that existing peripheral devices like GPIB controller IC's, serial UART's, or DAQ circuitries will migrate to the USB in the future to free up much needed port/connector space and to reduce form factors. Port consolidation of existing devices will occur gradually over time. To facilitate the acceptance of USB as the primary bus, a mechanism must be provided which supports existing devices and their protocol on the USB.

FIG. 1 shows a pre-USB system in which an I/O driver 10 of a host computer 12 is coupled to a peripheral I/O device 14 via, for example, a PCI or ISA bus interface circuit. The I/O device 14 could be almost any register based circuitry (for example, a GPIB controller IC, serial UART, or DAQ circuitry). This system implements a register based communication wherein I/O driver 10 models the I/O device 14 as a group of hardware registers. In this configuration, the I/O driver 10 accesses I/O device 14 by issuing individual requests to read or write data to one of the registers in I/O device 14. The I/O device 14 quickly responds by returning data from or writing to the designated register.

FIG. 2 shows the system of FIG. 1 supported for communication over a USB 18. Host computer 12 includes the I/O driver 10 implemented in the non-USB system shown in FIG. 1. Additionally, host computer 12 includes a USB driver 16 and USB interface logic circuit 20. The I/O driver 10 continues to model the I/O device 14 as a group of registers. To access a hardware register in I/O device 14, however, the I/O driver first passes its read or write data request to the USB driver 16 which coordinates construction and transmission of the Token, Data and Handshake packets required by USB protocol for transferring data to or from the I/O device 14. CPU with USB port (device interface) 22 is connected to I/O device 14 and is configured by firmware 24 to act as an interface allowing I/O device 14 to communicate with the host via the USB 18. Device interface 22 receives and decodes incoming packets (e.g. host generated Token packets) and generates complimentary Data or Handshake packets needed to complete a data transfer between I/O device 14 and host computer 12.

While the USB driver 16 and USB logic circuit 20 allow host computer 12 to communicate with I/O device 14 via USB 18, the I/O driver 10 still maintains its pre-USB protocol of modeling the I/O device 12 as a group of hardware registers. Each read or write request requires its own individual bus transaction for completion. Given that each USB bus transaction involves one or more sets of packets (Token, Data, Handshake) a significant amount of system overhead is required for each read or write request generated by the USB-based system of FIG. 2. This is particularly true when comparing the overhead of bus transfer for the non-USB system of FIG. 1. The increase in system overhead, in turn, limits the speed at which data communication is effectuated between the host computer 12 and the I/O device 14 shown in FIG. 2.

SUMMARY OF THE INVENTION

The present invention solves the aforementioned problems and others and provides an apparatus and method for posting write requests in a USB-based system. The present invention is implemented in the USB system in which a host computer is coupled to USB devices via a USB. The host computer is configured to generate requests to write data to memory of one of the USB devices at designated memory addressed therein. The host computer includes a queue for posting each write request upon generation thereof. The write requests are posted until the host computer generates a flush command in response to (1) the host computer generating a read data request, (2) the host computer determining that the most recently posted write request is directed to a USB device memory location which is nonpostable, or (3) the host computer determining that the queue lacks sufficient storage space for subsequent write requests. In response to the flush command, the host computer generates a data packet from the posted write requests. The data packet is transmitted to the USB device via the USB. The USB device, in turn, writes data to internal memory locations in accordance with the received data packets.

By posting the write requests in the queue, the host computer initiates a single bus transaction for a plurality of write requests rather than initiating a plurality of bus transactions, each one of which is for a single write request. The host computer comprises an I/O driver configured to generate individual requests to write data to memory locations within the I/O device in accordance with a software application executing in the host computer. Each write request generated by the I/O driver includes an address in the I/O device where data is to be written. A USB driver within the host computer is coupled to the USB and generates Data packets from the plurality of write requests posted in the queue. Once the Data packet is generated, the USB driver transmits the Data packet over the USB to the USB device. The host computer also includes a data structure stored in memory of the host computer for indicating postability of write requests posted within the queue. The data structure is accessible using addresses within the I/O device provided by the I/O driver write requests. A mini-driver coupled to the USB driver and data structure accesses the data structure using addresses of the write requests in order to determine the postability of the posted write request. If the mini-driver operating in connection with the data structure determines that the most recently posted write request is directed to a memory location which is nonpostable, the mini-driver issues the flush command which causes the USB driver to transmit a Data packet generated from the posted writes. A mini-driver is also configured to monitor storage availability within the queue after each write is posted. If the mini-driver determines that the queue is incapable of receiving further write requests as a result of a lack of sufficient storage space, the mini-driver initiates the USB driver to transmit a Data packet generated from the posted write request.

One advantage of the present invention is that it reduces overall traffic over the USB.

Another advantage of the present invention is that is ensures the integrity of data within the system.

Another advantage of the present invention is that it improves bus traffic without having to reconfigure application software or I/O drivers within the host computer.

BRIEF DESCRIPTION OF THE DRAWINGS

A better understanding of the present invention can be obtained when the following detailed description of the preferred embodiment is considered in conjunction with the following diagrams in which.

Figure 1:
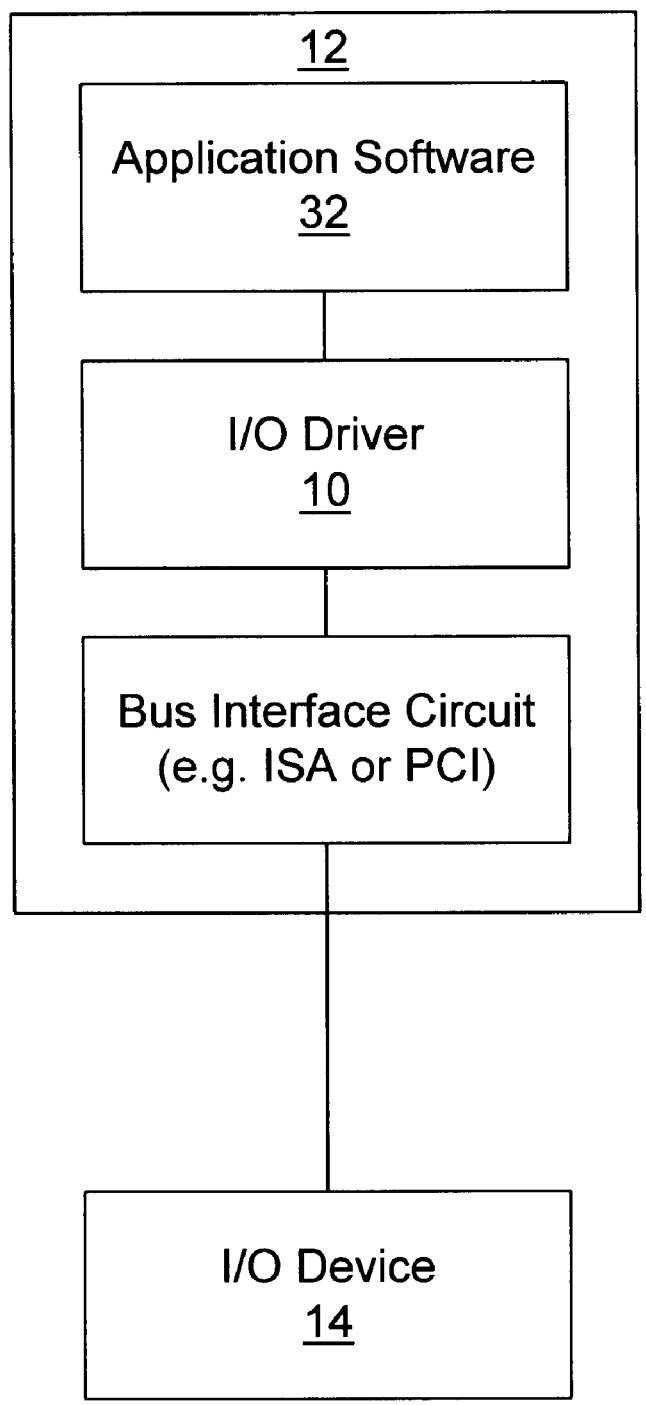
FIG. 1 represents a prior art non-USB based system.
Figure 2:
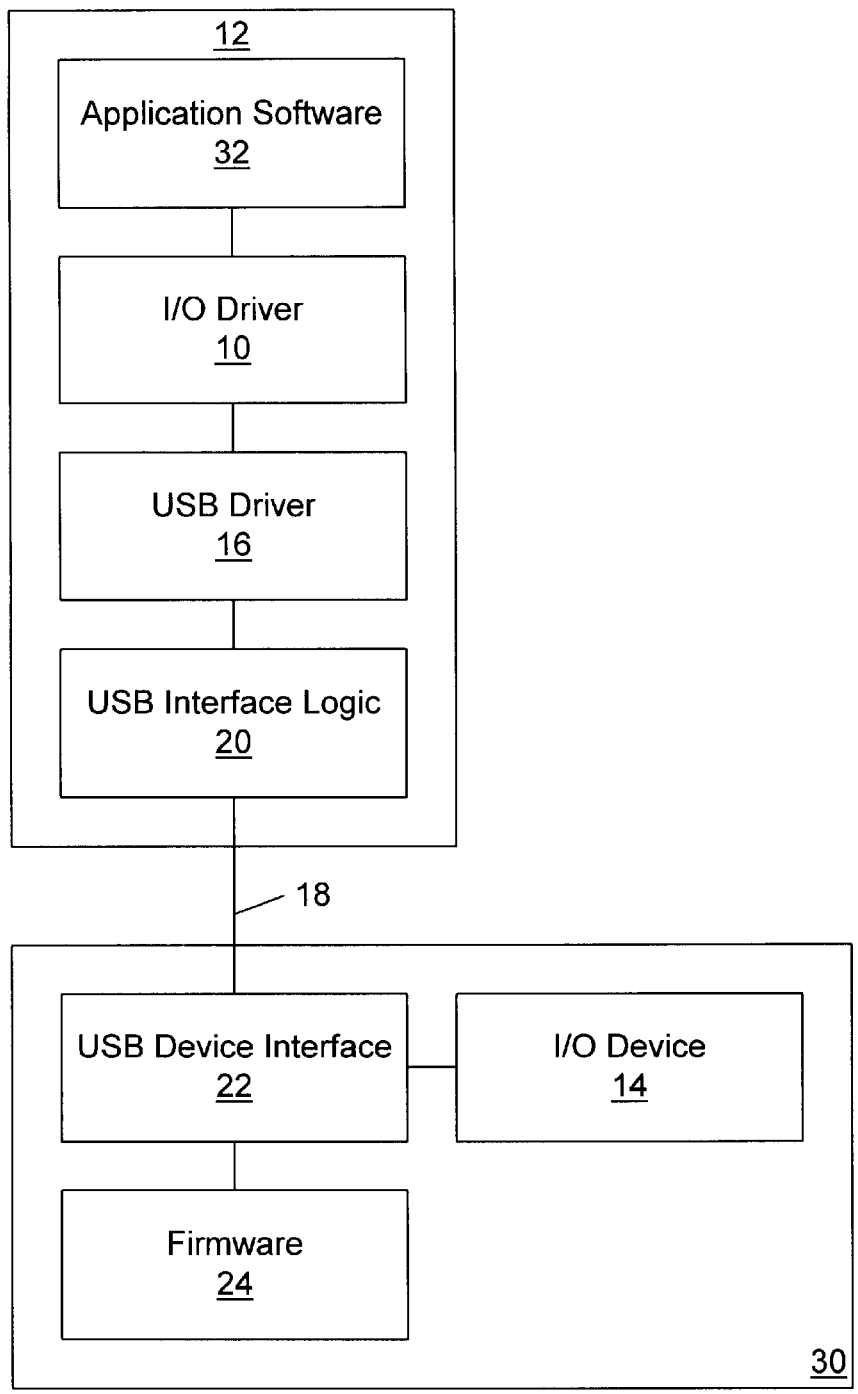
FIG. 2 represents the prior art system of FIG. 1 supported for communication over a USB.

While the invention is susceptible to various modifications and alternative forms, specific embodiments thereof are shown by way of example in the drawings and will herein be described in detail. It should be understood that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF THE PREFERRED EMBODIMENTS

Figure 3:
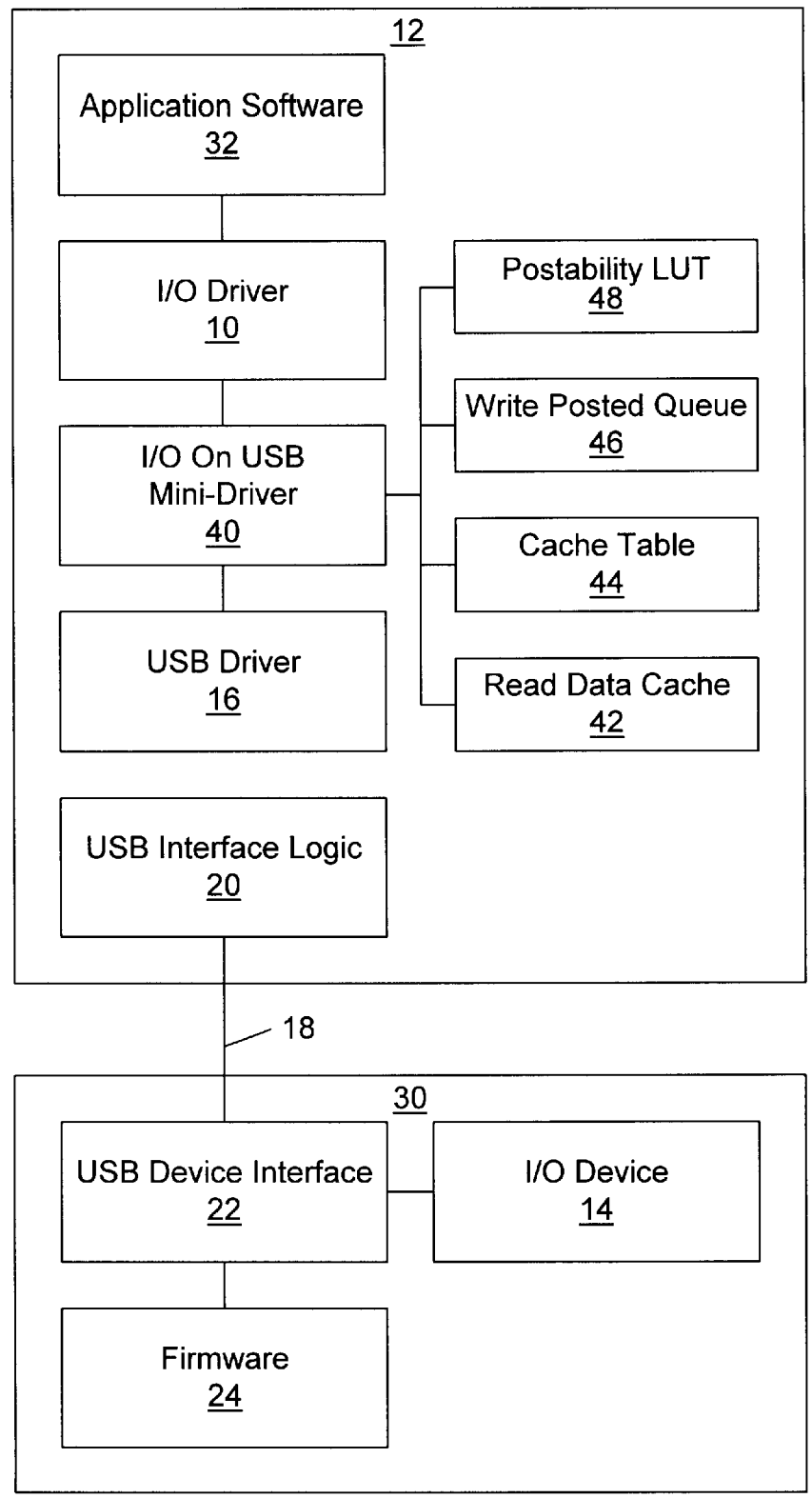
FIG. 3 represents a USB system employing the present invention.

FIG. 3 shows a USB system employing the present invention. More particularly, FIG. 3 shows a host computer 12 connected via USB 18 to a single USB device 30. However, the invention should not be limited thereto, it being understood that the present invention has application to host computer 12 connected to several USB devices 30 via USB 18.

Host computer 12 is configured to execute application software 32 and includes: I/O driver 10; USB driver 16; USB interface logic circuit 20; I/O on USB mini-driver (USB mini-driver 40); read data cache 42; cache table 44; posted writes queue 46, and; postability look-up table (LUT) 48.

In one embodiment, I/O driver 10, USB mini-driver 40, and USB driver 16 are implemented in software and executed by host computer 12. It is to be understood, however, that these components can be implemented in hardware. Further, postability is LUT 48, posted writes queue 46, read data cache 42, and cache table 44 are implemented in main memory (not shown) of host computer 12, it being understood that these components can be implemented in memory separate and apart from main memory of host computer 12.

USB device 30 includes: device interface 22 which, in one embodiment, is a CPU with a USB port; firmware 24, and; I/O device 14. I/O device 14 includes memory (not shown) accessible by device interface 22 acting in accordance with firmware 24 and commands received from host computer 12.

I/O driver 10 is configured to model I/O device 14 as group of hardware registers wherein each write or read request generated by I/O driver 10 is directed to accessing one of several hardware registers. While the present invention is being described in relation to modeling in I/O device 14 as a group of registers, it is to be understood that the present invention has application to accessing many types of memory in I/O device 14. I/O driver 10 generates I/O device 14 compatible access requests to read and write to I/O device registers in accordance with corresponding requests generated by application software 32. To access any of the registers in I/O device 14, I/O driver 10 in general must first pass its read or write request to the combination of USB mini-driver 40, USB driver 16, and USB interface logic circuit 20 which, coupled in a series, acts as a USB interface to I/O driver 10. This interface generally allows application software 32 and I/O driver 10 to operate in a USB system without reconfiguration of application software 32 and I/O driver 10.

Mini-driver 40 operates in response to read or write requests generated by I/O driver 10. Mini-driver 40 is coupled to posted writes queue 46, postability LUT 48, read data cache 42, and cache table 44. The posted writes queue 46 cacheability LUT 48, read data cache 42, and cache table 44 operate in connection with USB mini-driver 40 to ensure the integrity data provided to application software 32 upon read request.

Posted writes queue 46 stores one or more I/O driver 10 requests to write data to registers in I/O device 14. Posted writes queue 46 operates on a first in, first out basis to ensure that data will be subsequently written to registers of I/O device 14 in the sequence in which their associated write requests are stored in posted writes queue 46. Generally, USB mini-driver 40 diverts and stores each I/O driver request in posted writes queue 46. Once posted, the write requests are held until USB mini-driver 40 issues a flush queue command. The flush queue command issues upon one of several conditions which will be more fully described below. In response to the flush queue command, the posted write requests are provided to USB driver 16 which initiates a USB transaction wherein data to be written to one or more registers of I/O device 14, in accordance with the posted write request, is transmitted over USB 18 to USB device 30 in a single data packet. Thus, USB mini-driver 40 operating in connection with posted writes queue 46 defers transmission of write requests until several can be collected and sent over USB 18 in a single bus transaction. Advantageously, system overhead is lowered since data is written to several I/O device registers using a single data packet and one bus transaction as opposed to prior art methods of using multiple data packets requiring multiple bus transactions, one for each data write request generated by I/O driver 10.

Posted writes queue 46 is flushed in one of several situations. In the first instance, posted writes queue 46 is flushed in response to I/O driver 10 generating a request to read data from one of the I/O device 14 registers. Flushing posting writes queue 46 and writing to registers in I/O device 14 before reading data therein ensures that only reliable data is returned to I/O driver 10 upon request.

The posted writes queue 46 is also flushed when it becomes full. After each write request is posted, USB mini-driver 40 accesses posted writes queue 46 to determine whether space is available for subsequent write requests. If the mini-driver determines that there is no space available for subsequent write requests, mini-driver 40 issues the command which flushes posted writes queue 46.

Mini-driver 40 will also issue a flush command if it determines that the most recently stored write request is directed to an I/O device 14 register which is nonpostable. All registers of I/O device 14 can be categorized in one of two groups: postable and nonpostable. Usually, nonpostable registers include any register that can enable or disable the I/O device 14 from generating an interrupt (for example, the IMR3 register in the TNT482). Nonpostable registers may also include unused or rarely accessed registers. All other registers are postable. It is imperative that nonpostable registers in I/O device 14 are written to upon I/O driver requests with as little delay as possible. To achieve this goal, USB mini-driver 40 accesses postability LUT 48 after each write request is posted. Postability LUT 48 is a data structure which indicates the postability or nonpostability of each I/O device register to which a write request is directed. The postability LUT 48 is accessed using the addresses of the I/O device registers. USB mini-driver accesses postability LUT 48 with the register address of write request most recently posted. That is, the register address of the write request is used to access, or address, particular locations within the LUT 48 containing postability information. If the postability LUT 48 indicates that the targeted register is nonpostable, USB mini-driver 40 issues the command to flush posted writes queue.

USB mini-driver 40 may operate in connection with a cacheability look-up table (not shown) which also ensures integrity of the data in I/O device registers. Like the postability LUT 48, the cacheability LUT is accessible by USB mini-driver 40 using addresses of registers in I/O device 14 which contain requested data. Cacheability LUT identifies which data in I/O device 14 registers can be stored in cache 42. Each of the registers in I/O device 14 can be classified in one of two groups: cacheable and noncacheable. Noncacheable registers include any register that can change the status of I/O device 14 upon reading that register. An example of a noncacheable register is a FIFO. Noncacheable registers may also include unused or rarely accessed registers. All other registers of I/O device 14 are cacheable. Mini-driver 40 accesses cacheability LUT using the address of an I/O device register 14 which contains data requested by I/O driver 10. If the cacheability look-up table indicates that the targeted register is cacheable, USB driver 40 then checks cache table 44 to determine whether the requested data is contained in data cache 42. If so, data can be returned from data cache 42 without accessing I/O device 14 via USB 18. If the requested data is not cacheable according to cacheability LUT, then USB mini-driver 40 prompts USB driver 16 to initiate a bus transaction for retrieving the requested data from I/O device 14.

Read data cache 42 and cache table 44 are accessed by USB mini-driver 40 using addresses of I/O device 14 registers. In operation, USB mini-driver 40 receives an I/O driver's request to read data stored in one of the registers of I/O device 14. In certain instances, USB mini-driver 40 returns the requested data from cache 42 rather than initiating a USB transaction to obtain the requested data directly from I/O device 14. Accordingly, cache 42 increases the speed at which requested data is returned to I/O driver 10 while reducing the overall traffic on USB 18.

USB interface logic circuitry 20 provides the necessary hardware to allow USB driver 16 to communicate with USB 18. Likewise, device interface 22, operating in combination with firmware 24, allows I/O device 14 to communicate with USB 18 and thus host computer 12. Device interface 22 is configured to receive and decode Token, Data, or Handshake packets transmitted over USB 18 by host computer. Interface 22 is also configured to generate complimentary data and handshake packets for communicating with host computer 12 via USB 18. Device interface 22 includes a packet buffer (not shown) for storing data. More particularly, the packet buffer can store data transmitted over USB 18 from host computer 12 or for storing data to be transmitted over USB 18 to host computer 12. Device interface 22 also controls access to registers within I/O device 14 in accordance with commands received from host computer 12. Particularly, device interface 22, operating in connection with firmware 24, is configured to respond to register access commands including: readregister, readallregisters, and write register. In response to receiving a data packet containing a readregister command, firmware 24 directs device 22 to access a single register within I/O device 14 and transfer the contents thereof into packet buffer of interface 22 for subsequent transfer to host 12. In response to receiving a readallregisters command from host 12, firmware 24 directs interface 22 to access several predetermined registers in I/O device 14 and transfer the contents thereof to packet buffer of interface 22 for subsequent transfer to host 12. The predetermined registers might include those which contain cacheable data. In response to a write-register command, firmware 24 directs interface 22 to write to a register in I/O device 14 using data stored in packet buffer by host computer 12.

Figure 4:
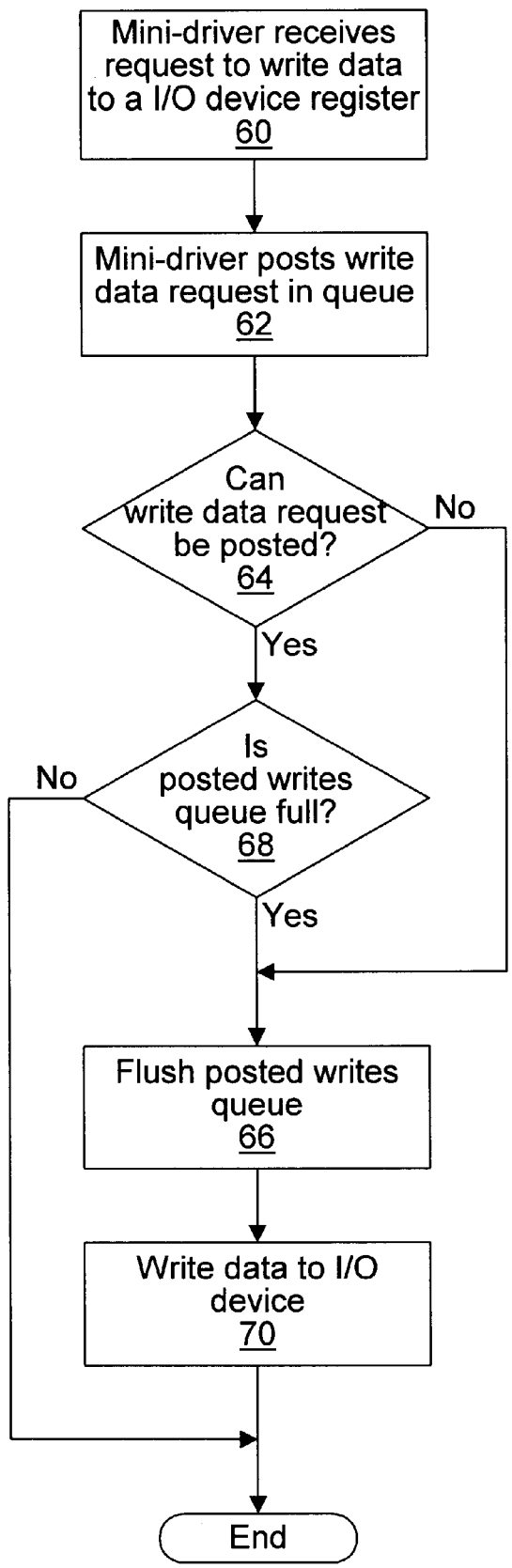
FIG. 4 is a flow chart explaining functional aspects of the USB system shown in FIG. 3.

With reference to FIG. 4, functional aspects of the USB system shown in FIG. 3 will now be explained. In step 60, mini-driver 40 receives a request to write data to an I/O device register from I/O driver 10. Typically, the request includes the data to be written and the address of the register within I/O device 14. In step 62, mini-driver 40 stores the received write request in posted writes queue 46. Thereafter, in step 64, mini-driver 40 accesses postability LUT 48 using the register address of the write request just stored in posted writes queue 46. If the postability LUT 48 indicates that the data is to be written to an I/O device register which is not postable, then USB mini-driver 40 issues a flush posted writes command in step 66. If the postability look-up table 48 indicates that the register to be written is postable, then USB mini-driver 40 proceeds to step 68 to determine whether posted writes queue 46 contains available space for future write requests. If mini-driver 40 determines that the posted writes queue 46 is full, the mini-driver 40 issues a flush posted writes command in step 66. Otherwise, mini-driver 40 waits for a subsequent read or write request from I/O driver 10. It is to be noted, however, that if I/O driver 10 issues a read request, then USB mini-driver 40 issues a flush posted writes queue command.

When a flush posted writes command is issued by USB mini-driver 40, USB driver 16 generates the necessary Data packets from the posted writes in queue 46 and transmits the resulting Data packet over USB 18 to the interface 22 of USB device 30. Thereafter, in step 68, USB device 22 writes to one or more of I/O device registers in accordance with the Data packet received from USB driver 16.

Figure 5:
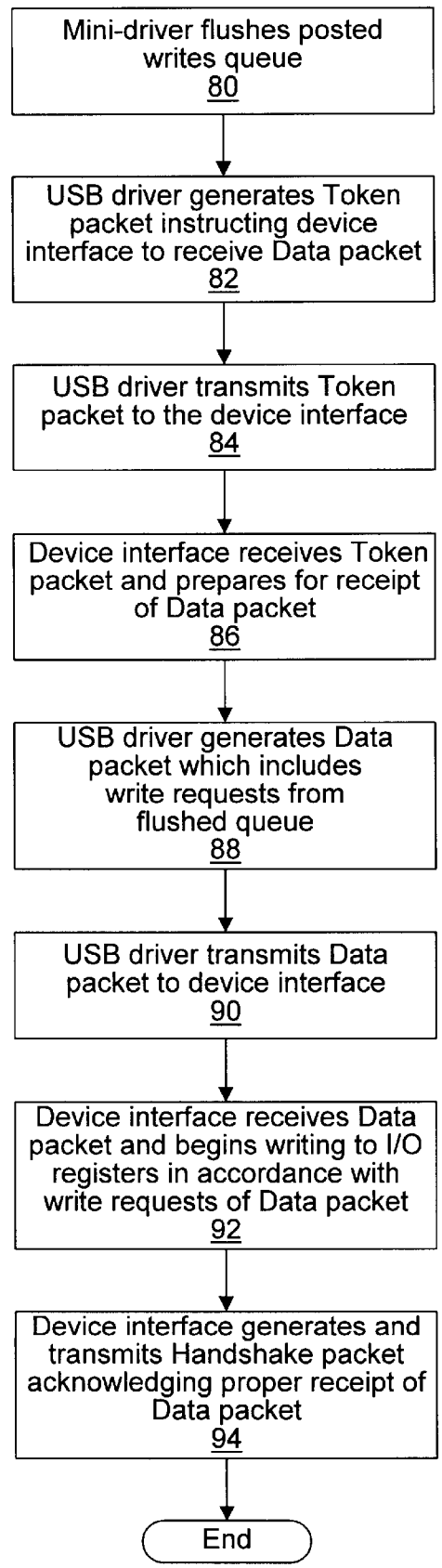
FIG. 5 is a flow chart illustrating operation of the USB driver shown in FIG. 3.

FIG. 5 shows the sequence of steps followed by USB driver 16 when USB mini-driver 40 issues a flush posted writes command. More particularly, in steps 80 and 82, USB driver 16 receives write requests flushed by mini-driver 40 and generates a Token packet containing instructions for device interface 22 to receive a subsequently transmitted Data packet. Thereafter, in step 84, USB driver 16 transmits the Token packet over USB 18 to USB device interface 22. In step 86, device interface 22 receives the token packet and prepares for receipt of the data packet. In step 88, the USB driver generates the Data packet from the flushed write request. In step 90, USB driver transmits the Data packet over USB 18 to device interface 22. In step 92, device interface 22 receives the Data packet and begins writing to registers of I/O device 14 in accordance with write requests transmitted with the data packet. In step 94, the device interface generates and transmits a handshake packet acknowledging proper receipt of the data packet.

The bus transaction of FIG. 5 is used for writing to one or several registers of I/O device 14. The amount of system overhead is substantially the same regardless of whether the transaction involves writing to one I/O device register or several I/O device registers in response to a flush posted writes command. Clearly, using the sequence of steps to write to several I/O device registers reduces USB 18 traffic when compared to prior art methods of using separate bus transactions involving steps 80 through 94 for each write request generated by I/O driver 10 regardless of whether the requests are directed to portable or non-portable registers.

The foregoing description of the invention is illustrative and explanatory thereof, and various changes in the methods and apparatus may be made without parting from the spirit of the invention as set forth in the following claims.

What is claimed is:

1. In a system including a host computer and USB devices coupled to the host computer via a universal serial bus (USB), wherein said host computer generates requests to write data to registers in the USB devices, a method comprising:

the host computer generating a first request to write a first data to a first register in a USB device at a first address;

the host computer posting the first request in a queue;

the host computer generating a second request to write second data to a second register in the USB device at a second address;

the host computer posting the second request in the queue;

the host computer generating a data packet from the first and second requests stored in the queue;

the host computer sending the data packet over the USB to the USB device;

the USB device writing the first and second data to the first and second registers in the USB device in response to the USB coupled device receiving the data packet from the host computer;

the host computer determining whether the second data is postable after the second request is posted in the queue;

wherein the host computer generates the data packet from the first and second write requests in response to the host computer determining the second data to be non-postable.

2. The method of claim 1 further comprising:

the host computer determining whether the queue has sufficient space to receive further host computer generated write requests;

wherein the host computer generates the data packet in response to the host computer determining that the queue lacks space for receiving further write requests.

3. The method of claim 1 further comprising:

the host computer creating a data structure including information indicating postability of data to be written to registers in the USB device, wherein the postability information in the data structure is accessible using addresses of the registers where data is to be written;

the host computer accessing the data structure with the second address to determine whether the second data is postable;

wherein the host computer generates the data packet in response to the data structure indicating the second data is nonpostable.

4. The method of claim 1 wherein the data packet includes address/data pairs including a first address/first data pair and a second address/data pairs.

5. A universal serial bus system comprising:

a universal serial bus (USB) for transmitting data between devices coupled to the USB;

a USB device coupled to the USB, the USB device having an addressable memory for storing data;

a host computer coupled to the USB, wherein the host computer is configured to generate individual requests to write data to memory of the USB device;

a queue for posting host computer generated requests to write data to memory of the USB device;

wherein the host computer is configured to generate a data packet for transmission over the USB to the USB device, wherein the data packet is generated from the write requests posted in the queue, and wherein the host computer is configured to generate the data packet when the queue lacks space to post further write requests.

6. The system of claim 5 further comprising a memory coupled to the host computer, for storing a data structure containing information indicating postability of host generated write requests in the queue, wherein the data structure is accessible using memory addresses of the USB where data is to be written.

7. The system of claim 6 wherein the host computer is configured to access the data structure using memory addresses in the USB device where data is to be written, wherein the host computer generates the data packet in response to the data structure indicating non-postability of a write request most recently posted in the queue.

8. The system of claim 5 further comprising:

a cache for storing data read from the USB device;

a cache table indicating the availability and validity of data stored in the cache;

wherein the host computer is configured to update the cache table to indicate that all data stored in the cache is invalid before generating the data packet.

9. A universal serial bus system comprising:

a universal serial bus (USB) for transmitting data in packets between devices coupled to the USB;

an I/O device coupled to the USB, wherein the I/O device comprises registers for storing data transmitted over the USB;

an I/O driver configured to generate individual requests to write data to registers of the I/O device, wherein each request includes an address of an I/O device register where data is to be written;

a queue for posting a plurality of write requests generated by the I/O driver;

a USB driver coupled to the USB and queue, for generating a data packet from the plurality of write requests posted in the queue, wherein the USB driver is configured to transmit the data packet over the USB;

wherein data is written to registers of the I/O device in response to the USB driver generating and transmitting the data packets;

a data structure stored in memory for indicating postability of write requests posted in the queue, wherein the data structure is accessible using addresses of the I/O device registers;

a mini-driver coupled to the USB driver and data structure, wherein the mini-driver is configured to access the data structure using the I/O device register addresses of write requests posted in the queue to determine the postability thereof;

wherein the USB driver generates the data packet in response to the mini-driver determining non-postability of one of the write requests stored in the queue.

10. The system of claim 9 wherein the USB driver generates the data packet when the queue lacks space for posting further write requests.

11. The system of claim 10 further comprising:

a cache coupled to the mini-driver, for storing data read from registers of the I/O device;

a cache table coupled to the mini-driver, for indicating availability and validity of data stored in the cache table;

wherein the mini-driver is configured to update the cache table to indicate that all data stored in the cache is invalid in response to the generation and transmission of the data packet.

12. In a system including a host computer and USB devices coupled to the host computer via a universal serial bus (USB), wherein said host computer generates requests to write data to the USB devices, a method comprising:

the host computer generating a first request to write a first data to memory in a USB device at a first memory address;

the host computer posting the first request in a queue;

the host computer generating a second request to write second data to memory in the USB device at a second memory address;

the host computer posting the second request in the queue;

the host computer determining whether the second data is postable;

the host computer generating a data packet from the first and second requests stored in the queue in response to the host computer determining the second data to be nonpostable;

the host computer sending the data packet over the USB to the USB device, and;

the USB device writing the first and second data into memory of the USB device in response to the USB device receiving the data packet from the host computer.

13. The method of claim 12 further comprising:

the host computer determining whether the queue has sufficient space to receive further host computer generated write requests;

wherein the host computer generates the data packet in response to the host computer determining that the queue lacks space to receive further write requests.

14. The method of claim 12 further comprising:

the host computer generating a request to read data from the USB device;

wherein the host computer generates the data packet in response to the host computer generating the request to read data.

15. The method of claim 12 further comprising:

the host computer creating a data structure including information indicating postability of data to be written to memory in the USB device, wherein postability information in the data structure is accessible using memory addresses in the USB device where data is to be written;

the host computer accessing the data structure with the second address to determine whether the second data is postable;

wherein the host computer generates the data packet in response to the data structure indicating the second data is nonpostable.

16. The method of claim 12 further comprising:

the host computer creating a cache to store data returned from the USB device;

the host computer generating a cache table including information indicating the availability and validity of data stored in the cache;

wherein the host computer updates the information in the cache table to indicate that all data stored in the cache is invalid in response to the host computer posting the first write request.

* * * * *